United States Patent [19]

Jones

[11] 4,209,092
[45] Jun. 24, 1980

[54] PLANT CONTAINER

[75] Inventor: Roy Jones, Medford, Oreg.

[73] Assignee: Jackson & Perkins Co., Medford, Oreg.

[21] Appl. No.: 972,946

[22] Filed: Dec. 26, 1978

[51] Int. Cl.$^2$ ............................................. B65D 85/52
[52] U.S. Cl. ..................................... 206/423; 47/84;
229/37 E; 229/39 R
[58] Field of Search ........... 206/423; 229/39 B, 39 R,
229/37 R, 37 E; 47/84

[56] References Cited
U.S. PATENT DOCUMENTS 2,421,748  6/1947  Fink ................................. 229/39 B 4,069,917  1/1978  Stollberg et al. .................... 206/423

Primary Examiner—William T. Dixson, Jr.
Attorney, Agent, or Firm—Klarquist, Sparkman, Campbell, Leigh, Hall & Whinston

[57] ABSTRACT

A container suitable for receiving and transporting plants is formed from a blank of paperboard and includes front and back panels joined by side panels to provide a container of rectangular cross section. A flap attached to the back panel folds into a reinforced handle, and a top panel is folded inwardly from the front of the container. Gussets joining the top panel to the side panels are also folded inwardly for reinforcing the top panel.

10 Claims, 6 Drawing Figures

PLANT CONTAINER

BACKGROUND OF THE INVENTION

The present invention relates to a container for receiving and transporting plants, and particularly to such a container exhibiting improved structural integrity as well as ease of manufacture.

Plants, and in particular rose plants, are conveniently stored and transported in containers usable for planting purposes, i.e., wherein the container itself can be deposited in the ground. The container is suitably formed from a sheet or blank of paperboard material foldable to provide sides, a bottom, and a top having an aperture through which the stem of the plant extends. Examples of prior art containers of this type are described in U.S. Pat. Nos. 3,521,741 issued to G. A. Beaudry on July 28, 1970, and 4,069,917 issued to R. H. Stollberg et al on Jan. 24, 1978.

In prior constructions, the top of the container is formed as a separate flap or hinged panel joined to the container along one edge and folded into the container. The top panel is then desirably secured in place to prevent possible loss of material from inside the container or damage to the plant. For example, the top panel can be glued in place. Prior constructions have relied upon a tab and slot configuration or frictional engagement for securing the top panel, and, as in the case of gluing, an additional step is required in the assembly of the container. Also, frictional engagement is not particularly secure, and tabs can be incorrectly positioned relative to receiving slots or can come loose during container use.

SUMMARY OF THE INVENTION

In accordance with the present invention, a container suitable for receiving and transporting plants includes front and back panels, and side panels hingedly connected therebetween to form a container. A re-entrant flap is hingedly joined to the top edge of the front panel and is turned downwardly within the container structure for defining a well which conveniently receives water for the plant. A top panel is hingedly connected to the remaining side of the re-entrant flap while side gussets hingedly connected to the sides of the top panel and the top edges of the side panels are reversely folded downwardly between the top panel and the side panels along diagonal fold lines. As a consequence of this construction, the top panel is automatically positioned as the container is folded together, and is held firmly in place without need for gluing, the employment of various tab and slot arrangements, or frictional engagement.

The container is suitably formed from a unitary blank of paperboard material or the like, and it is understood the aforementioned gussets comprise a part of the same sheet or blank of material as the top and side panels to which they are joined. The supporting structure is achieved in a folding operation which disposes the gussets downwardly between the top and side panels.

It is accordingly an object of the present invention to provide an improved plant container formed from a common sheet or blank of paperboard material or the like, and which is characterized by improved structural rigidity.

It is another object of the present invention to provide an improved plant container adapted for simplified construction and requiring fewer steps in assembly.

It is another object of the present invention to provide an improved plant container offering enhanced protection to the plant carried thereby.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
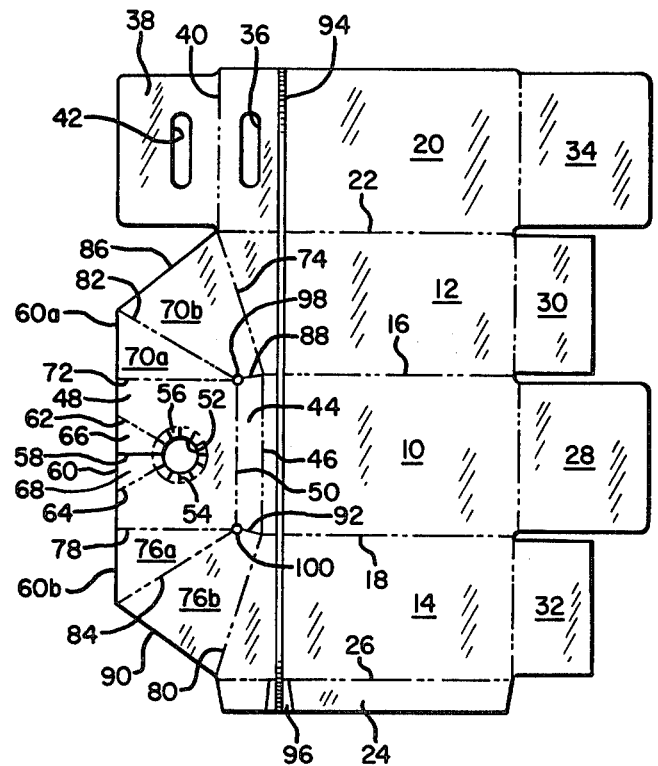
FIG. 1 is a plan view of a blank of sheet material according to the present invention which is formed in such manner as to be foldable into a complete plant container.

A container according to the present invention, is initially formed from a flat blank or sheet of double-faced, corrugated paperboard or comparable material which is die cut to provide the configuration illustrated in FIG. 1. As successively illustrated in FIGS. 2, 3 and 4, the blank is adapted to be folded along certain hinge lines or fold lines into the upright container depicted in FIG. 4. The container includes a front panel 10 hingedly connected to side panels 12 and 14 on either side thereof along vertical hinge lines or score lines 16 and 18 respectively. A back panel 20 is secured to side panel 12 along vertical hinge line 22, while a narrow sealing strip 24 is joined to side panel 14 along vertical hinge line 26. Side panels 12 and 14 are suitably of the same size, while back panel 20 has the same width as front panel 10 but is somewhat longer.

Figure 3:
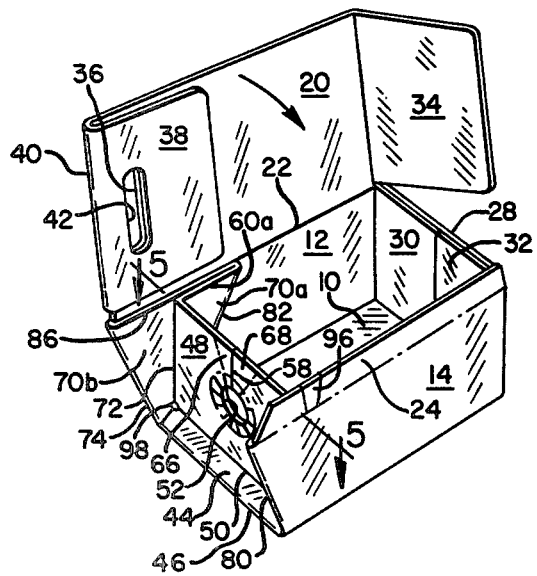
FIG. 3 illustrates a nearly-formed container according to the present invention having its back panel open so that a plant may be received therewithin.
Figure 4:
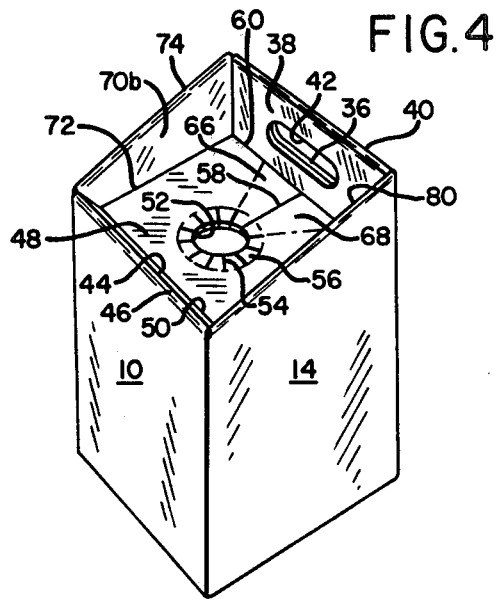
FIG. 4 is a perspective view of a completed plant container according to the present invention.

A bottom closure for the container comprises bottom panels 28, 30, 32 and 34 hingedly connected to panels 10, 12, 14 and 20 respectively at their lower extremities. Panels 30 and 32 have approximately half the width of panels 28 and 34 to extend approximately halfway across the container bottom while panels 28 and 34 provide a full width closure. As illustrated in FIG. 3, panels 30 and 32 can be folded inward towards each other from the sides, and the full sized panel 28 is folded thereover and sealed. Remaining panel 34 can be folded within the container after filling. (See FIG. 3.)

Near the top of the container, back panel 20 is provided with an elongated, horizontal opening 36 and a back flap 38 joined to panel 20 along horizontal fold line 40 includes a similar opening 42 which aligns with opening 36 when back flap 38 is folded downwardly, as indicated in FIG. 3. The configuration provides a reinforced carrying handle for the container.

Narrow re-entrant flap 44 is joined to the upper edge of front panel 10 along fold line 46 and carries at its forward edge a top panel 48 hingedly connected to flap 44 along fold line 50. Top panel 48 is rectangular in shape and is provided with a central plant receiving aperture 52 having a plurality of short radial cuts 54 extending outwardly therefrom defining tabs 56 therebetween. A longer cut 58 is located in perpendicular relation to the upper outside edge 60 of the blank, with diagonal fold lines 62 and 64 positioned on either side thereof defining tabs 66 and 68 bendable in a direction for providing access to the aperture 52 whereby the stem of a plant can be located therewithin.

The re-entrant flap 44 is trapezoidal in shape whereby fold line 50 is slightly shorter than fold line 46, in other words top panel 48 is slightly narrower than front panel 10 for conveniently accommodating the folding of the blank material as hereinafter indicated. A gusset 70 comprising sections 70a and 70b joins side 72 of top panel 48 to top edge 74 of side panel 12 along corresponding fold lines. Also, a gusset 76 comprising sections 76a and 76b joins the side 78 of top panel 48 to the top edge 80 of side panel 14 along corresponding fold lines. Gusset sections 70a and 76a are triangular in shape having first sides coincident with the outside edge 60 of top panel 48 extended, second sides corresponding to fold lines 72 and 78, and third sides 82 and 84 comprising fold lines which extend diagonally outwardly from the locations where top panel sides 72 and 78 join flap 44, while making acute angles with sides 72 and 78. The second section of each of the gussets is trapeziform in shape. Gusset section 70b extends between a first pair of opposite sides corresponding to fold lines 82 and 74, and between a second pair of opposite sides comprising straight outer edge 86 and fold line 88 defining a side of flap 44. Gusset section 76b has a first pair of opposite sides defined by fold lines 84 and 80 and a second pair of opposite sides comprising straight outer edge 90 and fold line 92 defining a side of flap 44. Fold lines 72, 82 and 88 intersect at a small aperture 98, while a small aperture 100 is positioned at the intersection of fold lines 78, 84 and 92. These apertures define the intersection points of the fold lines to facilitate the folding required and also assist in draining water into the interior of the container.

Back panel 20 is taller than front panel 10, and consequently both side panel upper edges 74 and 80 extend diagonally upwardly from panel 10 toward panel 20 and strip 24 respectively so as to intersect back panel 20 at the location of fold line 40. Fold lines 74 and 80 also make an acute angle with the sides 72 and 78 of top panel 48. Outer edges 86 and 90 are disposed between upper outside edge 60 as extended and the junction of fold lines 74 and 80 with the back panel.

The inner side of strip 24 is provided with glue so the same may be folded over in a sealing relation to the outside of back panel 12 in the completed construction. Also, bottom panels 28, 30 and 32 (and 34 if desired) are glued together. Furthermore, back flap 38 is suitably glued or otherwise secured in its downwardly folded position against the inner side of back panel 20. For subsequent opening of the container, a tear strip 94 which may be formed of self-adhesive nylon is located all the way around the interior of the container ending in a pull tab 96 defined between a pair of short cut lines in strip 24. The top of the container may be removed by means of the tear strip before positioning the box in the ground for planting.

Figure 2:
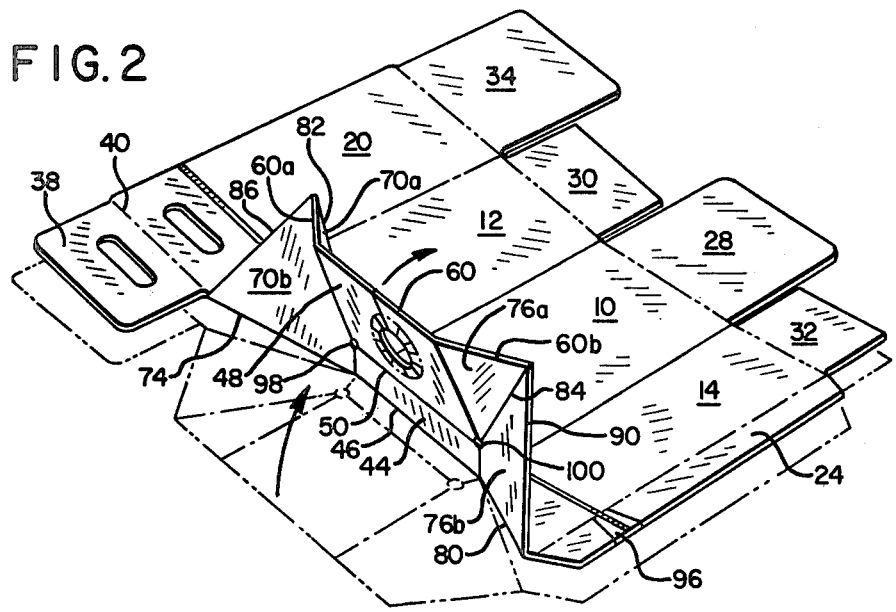
FIG. 2 illustrates the FIG. 1 blank undergoing an initial folding step in forming a plant container according to the present invention.

Referring to FIG. 2, the blank is folded into the shape of the container by first moving the top panel 48 upwardly and inwardly as indicated by the arrow, while also folding flap 44 toward front panel 10. The side gussets are reversely folded downwardly along the diagonal lines 82 and 84 in such manner that triangular sections 70a and 76a provide upward support for the top panel 48. Upward folding of side panels 12 and 14 with respect to front panel 10 will be accomplished at the same time inasmuch as they are connected to the top panel by the gussets.

Particularly considering FIG. 3, the container is illustrated as folded together except for the back panel 20. Note the side gussets are reversely folded downwardly between the top panel 48 and the side panels. Before lowering back panel 20 in the direction indicated by the arrow, the plant stem is inserted into aperture 52 after temporarily bending tabs 66 and 68 away from cut line 58. Potting materials and the plant's root system are located within the container space. Thereafter, back panel 20 is folded down, bottom panel 34 is secured in place, and sealing strip 24 is secured over back panel 20 thus completing the container in the manner illustrated in FIG. 4.

Figure 5:
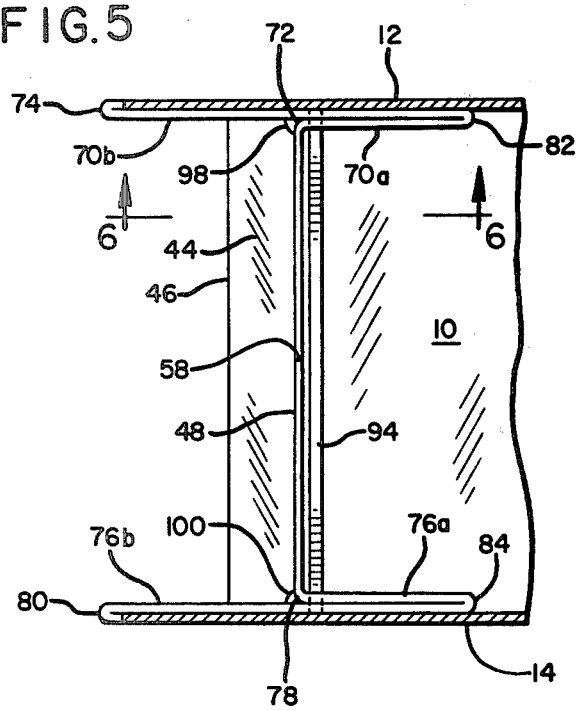
FIG. 5 is a transverse cross section of such container as taken at 5—5 in FIG. 3.
Figure 6:
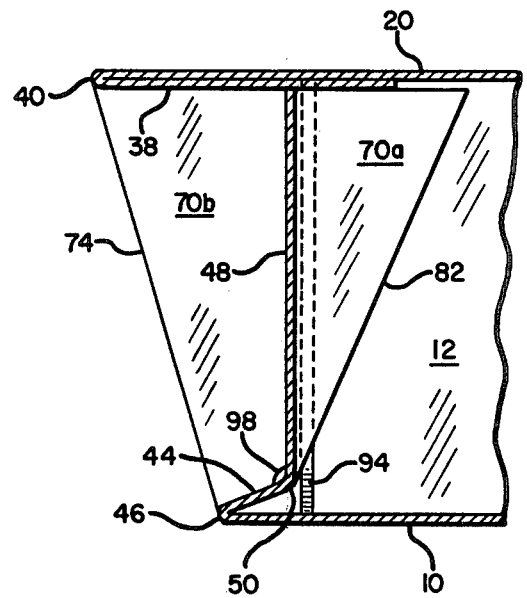
FIG. 6 is a longitudinal cross section of such container as taken at 6—6 in FIG. 5.

As will be noted from the FIG. 3 view as well as from the views of FIGS. 5 and 6, the side 60a of triangular gusset section 70a is suitably approximately half the length of outer edge 86 of gusset section 70b. Furthermore, the angle formed by sides 22–74 equals the angle formed by sides 74–86 such that outer edge 86 when folded downwardly lies along the corner formed by fold line 22. Furthermore, the angle formed by sides 86–82 equals the angle formed by sides 82–60a whereby side 60a also lies along the corner formed by fold line 22. This configuration (which is duplicated on the opposite side) strengthens the support for top panel 48 while disposing the same in a substantially horizontal plane in the final container, i.e., in perpendicular relation to the sides, front and back of the container. It also braces the top panel against undesired upward (or downward) movement.

As can be seen in FIG. 6, the re-entrant flap 44 will be positioned at an acute angle with respect to front panel 10 in order to form the described configuration from a flat sheet of material. The top panel 48 is located thereby at a depressed or inset level with respect to the top edges of the container, with the top panel together with flap 44, back flap 38, and gusset sections 70b and 76b enclosing a well at the top of the container for watering the plant. Thus, water received at the container top drains downwardly via central aperture 52 and small apertures 98 and 100, as well as around the edge of top panel 48 adjacent back panel 20, into the interior of the container.

It will be noted the container according to the present invention is conveniently formed from a single blank of material with a minimum of waste, while at the same time providing a secure and integral structure without requiring extensive gluing or positioning of various tabs and the like as might be incorrectly positioned or come loose during use of the container.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A container suitable for receiving and transporting plants and adapted to be formed from a common sheet of material, said container comprising:

front and back panels and side panels hingedly connected therebetween to form a substantially vertical container structure of rectangular cross section, panel means for closing the bottom of said container structure, a re-entrant flap hingedly joined to the top edge of said front panel and adapted to be turned downwardly within said container structure, a top panel hingedly connected to the remaining side of said re-entrant flap and positioned by said re-entrant flap below the top edge of said front panel to provide a recessed portion of said container above said top panel, said top panel being provided with a plant receiving aperture, and side gussets hingedly connected to sides of said top panel and top edges of said side panels, each of said side gussets being reversely folded downwardly between said top panel and said side panels along a diagonal fold line making an acute angle with side edges of said top panel for positioning said top panel in substantially perpendicular relation to said front, back and side panels, wherein said gussets between sides of said top panel and said diagonal fold line are triangular in shape, each having a side extending the side of said top panel remote from said flap, the remainder of each of said gussets being trapeziform in shape having a straight outer edge joining the extended side of the triangular section to the top edge of a said side panel and positioned along and in adacent parallel relation to said back panel along the corner of the container.

2. The container according to claim 1 wherein the top edges of said side panels extend angularly upwardly from said front panel toward said back panel, each of said top edges making a similar acute angle with the top panel of said container.

3. The container according to claim 1 further including a back flap hingedly connected to the top edge of said back panel and adapted to be folded downwardly between said back panel and the rearward edge of said top panel.

4. The container according to claim 3 wherein said back panel and said back flap are provided with matching gripping holes above said top panel.

5. The container according to claim 1 wherein each said diagonal fold line extends angularly outwardly on a said gusset from a point where the side edge of said top panel meets the side edge of said flap making an acute angle with the side edge of said top panel.

6. A sheet material construction adapted to be formed into a container suitable for receiving a plant therewithin prior to closure of said container, said sheet material construction comprising:

a front panel, side panels joined to said front panel along first vertical fold lines, and a back panel joined to one of said side panels along a second vertical fold line, a closing strip adapted for joining the remaining side panel to the back panel along a third vertical fold line to complete a container structure of substantially rectangular cross section, panel closure means adjoining the bottom edge of at least one of said panels and adapted to be folded with respect thereto for forming a bottom for said container, a flap foldably connected to the top edge of said front panel and adapted to be folded downwardly within said container, a top panel hingedly joined to the remaining side of said flap, said top panel having a central plant receiving aperture and a stem receiving cut extending from said aperture to an outside edge of said top panel opposite said flap, and a pair of side gussets hingedly connected to sides of said top panel and to top edges of said side panels, each of said gussets having a diagonal fold line making an acute angle with side edges of said top panel adapting each said gusset to be folded about said fold line for extending downwardly between said top panel and said side panels for positioning said top panel in substantially perpendicular relation to said front, back and side panels, wherein said gussets between sides of said top panel and said diagonal fold line are triangular in shape, each having a side extending the side of said top panel remote from said flap, the remainder of each of said gussets being trapeziform in shape having a straight outer edge adjoining the extended side of the triangular section to the top edge of a said side panel for positioning adjacent said back panel.

7. The sheet material according to claim 6 wherein each said diagonal fold line extends angularly outwardly on a said gusset from a point where the side edge of said top panel meets the side edge of said flap.

8. The sheet material according to claim 7 wherein said top panel is narrower than said front panel, said flap being trapezoidal in shape for joining said front panel to said top panel.

9. The sheet material according to claim 6 wherein said straight outer edge is approximately twice as long as the extended side of the triangular section.

10. The sheet material according to claim 6 wherein the angle between a said second or third vertical fold line and the top edge of the adjoining side panel is equal to the angle between said top edge of said adjoining side panel and the straight outer edge of the trapeziform portion of the adjoining gusset, and wherein the angle between said straight outer edge of the trapeziform portion of said adjoining gusset and the gusset diagonal fold line is equal to the angle between said diagonal fold line and the extended side of the triangular section of said adjoining gusset.

* * * * *